(12) United States Patent
Huck et al.

(10) Patent No.: US 6,654,877 B1
(45) Date of Patent: Nov. 25, 2003

(54) SYSTEM AND METHOD FOR SELECTIVELY EXECUTING COMPUTER CODE

(75) Inventors: Jerome Huck, Palo Alto, CA (US); Carol L. Thompson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 644 days.

(21) Appl. No.: 09/644,435

(22) Filed: Aug. 23, 2000

(51) Int. Cl.[7] ............ G06F 9/44; G06F 11/36; G06F 9/45
(52) U.S. Cl. ............ 712/229; 712/227; 712/236; 717/128; 717/130; 717/141
(58) Field of Search ............ 717/128, 129, 717/130, 124, 127, 141; 714/38; 712/233, 245, 231, 236, 226, 227, 229

(56) References Cited

U.S. PATENT DOCUMENTS

| | | | |
|---|---|---|---|
| 5,754,861 A | * 5/1998 | Kumar ............ | 717/128 |
| 5,784,552 A | * 7/1998 | Bishop et al. ............ | 714/38 |
| 5,956,758 A | 9/1999 | Henzinger et al. ............ | 711/213 |
| 5,961,636 A | 10/1999 | Brooks et al. ............ | 712/228 |
| 6,076,158 A | 6/2000 | Sites et al. ............ | 712/230 |
| 6,108,773 A | 8/2000 | Col et al. ............ | 712/237 |
| 6,108,777 A | 8/2000 | Puziol et al. ............ | 712/240 |

* cited by examiner

Primary Examiner—Daniel H. Pan

(57) ABSTRACT

A system of the present invention utilizes memory for storing a computer program and processing circuitry for processing and executing instructions of the computer program. In particular, the computer program includes a set of code and an unconditional branch instruction. The processing circuitry, in executing the computer program, receives run time data indicative of whether the set of code is enabled or disabled, and based on the run time data, the processing circuitry sets a value of a mode indicator. While the program is running, the processing circuitry receives and processes the unconditional branch instruction. When the set of code is disabled, the processing circuitry executes the unconditional branch instruction based on the mode indicator, thereby preventing execution of the set of code. However, when the set of code is enabled, the processing circuitry refrains from executing the unconditional branch instruction based on the mode indicator and executes the set of code. Thus, execution of the set of code is selectively enabled based on the status of the mode indicator.

9 Claims, 4 Drawing Sheets

SYSTEM AND METHOD FOR SELECTIVELY EXECUTING COMPUTER CODE

BACKGROUND OF THE INVENTION

1. Field of the Invention

The present invention generally relates to computer processing techniques and, in particular, to a system and method for enabling selective execution of certain sets of code within a computer program without significantly affecting the execution performance of the program.

2. Related Art

In some computer applications, it is desirable to perform certain functionality only in a limited number of circumstances. For example, a computer program may include testing code (e.g., assertions) that test for certain conditions to ensure that the program is running correctly. While it may be desirable to run this testing code during the debugging and/or testing phases, it may be less desirable to run this testing code in normal operation, since the testing code utilizes processor time. In this regard, execution of the testing code is not required for the computer program to operate correctly and is only useful if there is an error that can be detected by the testing code. Thus, executing the testing code when the computer program runs free of errors needlessly utilizes processor time.

As a result, most computer programs that include testing code are usually recompiled once the testing and debugging phases are complete. During recompilation, insertion of testing code into the recompiled programs is prevented such that the recompiled programs do not include any testing code. The recompiled programs run more efficiently since there is no testing code to execute, and it is these recompiled programs that are usually sold to and used by consumers.

However, even after the testing and debugging phases have been completed, there may still be some bugs in the computer program that could be detected by the removed testing code, and once the testing code has been removed, the computer program lacks the capability of detecting these bugs. Therefore, a tradeoff exists between leaving testing code in a computer program and removing the testing code from the computer program. In this regard, the testing code may be removed from the computer program to improve the performance of the program, or the testing code may be left in the program to test for certain errors, thereby adversely affecting the program's performance.

When the testing code is included in the program, there are steps that can be taken to mitigate the adverse effect of the code en the program's performance. For example, conditional branches (e.g., "IF" instructions) based on user inputs, or other types of inputs, can be inserted into the program to branch around portions of the testing code when execution of the testing code is not desired. However, the number of these conditional branches can be relatively large when the testing code is spread throughout the program. Therefore, although the adverse impact of testing code in a computer program can be mitigated, there still exists at least some impact to the program's performance, whether or not the testing code is executed, and this impact can be significant.

Thus, a heretofore unaddressed need exists in the industry for providing a system and method of enabling selective execution of certain code (e.g., testing code) within a computer program based on inputs at run time with minimal or no affect to the program's performance when execution of the foregoing code is not desired.

SUMMARY OF THE INVENTION

The present invention overcomes the inadequacies and deficiencies of the prior art as discussed hereinbefore. Generally, the present invention provides a system and method for selectively executing sets of code in computer programs.

In architecture, the system of the present invention utilizes memory for storing a computer program and processing circuitry for processing and executing instructions of the computer program. In particular, the computer program includes a set of code and an unconditional branch instruction. The processing circuitry, in executing the computer program, receives run time data indicative of whether the set of code is enabled or disabled, and based on the run time data, the processing circuitry sets a value of a mode indicator. While the program is running, the processing circuitry receives and processes the unconditional branch instruction. When the set of code is disabled, the processing circuitry executes the unconditional branch instruction based on the mode indicator, thereby preventing execution of the set of code. However, when the set of code is enabled, the processing circuitry refrains from executing the unconditional branch instruction based on the mode indicator and executes the set of code. Thus, execution of the set of code is selectively enabled based on the status of the mode indicator.

The present invention can also be viewed as providing a method for selectively executing sets of code in computer programs. The method can be broadly conceptualized by the following steps: storing a computer program, the computer program having a set of code and an unconditional branch instruction; receiving run time data, during a run of the program, indicating whether the set of code is enabled; setting a value of a mode indicator based on the run time data; determining whether to execute the unconditional branch instruction based on the value of the mode indicator; processing the unconditional branch instruction based on the determining step; and executing the set of code if a determination is made in the determining step to refrain from executing the first unconditional branch instruction.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

In general, the present invention relates to a system and method for enabling selective execution of certain code (e.g., testing code) in a computer program with minimal impact to the execution performance of the program. In fact, when the foregoing code is disabled, the execution performance of the computer program should be the same or at least comparable to the execution of a similar program that does not include the disabled code. In this regard, the presence of the disabled code in the executed program should not adversely affect the performance of the program.

Figure 1:
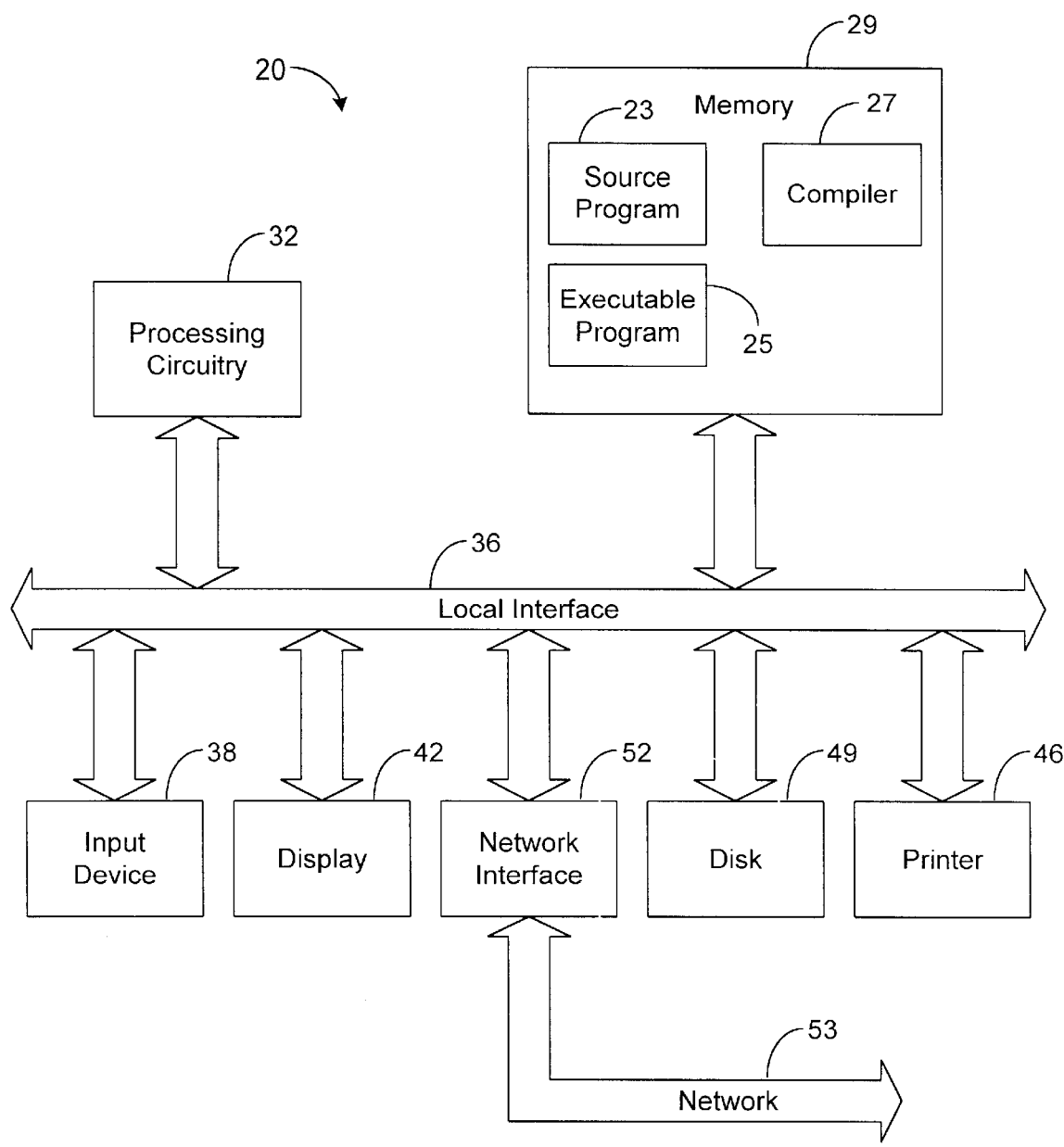
FIG. 1 is a block diagram illustrating a computer system in accordance with the present invention.

FIG. 1 depicts a computer system 20 designed to implement the present invention. As shown by FIG. 1, the computer system 20 may include a source program 23, an executable program 25, and a compiler 27 stored in memory 29. The executable program 25 may be generated by the compiler 27, which is configured to translate the source program 23 into a form compatible with processing circuitry 32. In this regard, the compiler 27 translates the source program 23 into the executable program 25, which may then be executed by processing circuitry 32. However, it should be noted that the compiling of the source program 23 into the executable program 25 does not form a material part of the present invention, and it is not necessary for the executable program 25 to have been compiled by any compiler.

Note that the source program 23, the executable program 25, and/or the compiler 27, when the compiler 27 is implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain. store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed as the program can be electronically captured, via for instance optical scanning of the paper or other medium, then compiled, interpreted or otherwise processed in a suitable manner if necessary, and then stored in a computer memory. As an example, the source program 23, the executable program 25, and/or the compiler 27 may be magnetically stored and transported on a conventional portable computer diskette.

The processing circuitry 32 may be a digital processor or other type of circuitry configured to run the executable program 25 by processing and executing the instructions of the program 25. The processing circuitry 32 communicates to and drives the other elements within the system 20 via a local interface 36, which can include one or more buses. Furthermore, an input device 38, for example, a keyboard, a switch, a mouse, and/or other type of interface, can be used to input data from a user of the system 20, and screen display 42 or a printer 46 can be used to output data to the user. A disk storage mechanism 49 can be connected to the local interface 36 to transfer data to and from a nonvolatile disk (e.g., magnetic, optical, etc.). The system 20 can be connected to a network interface 52 that allows the system 20 to exchange data with a network 53.

Figure 2:
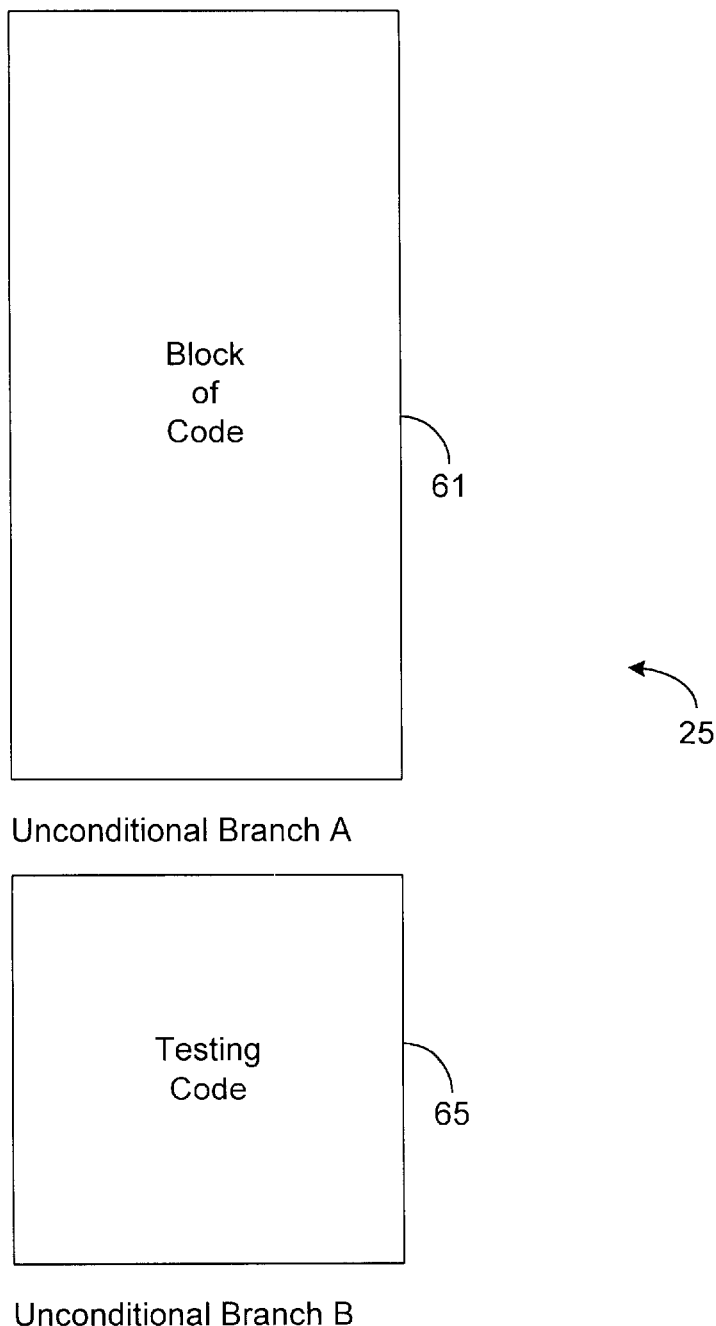
FIG. 2 is a block diagram illustrating a more detailed view of an executable program depicted in FIG. 1.

FIG. 2 depicts a more detailed view of an exemplary embodiment of at least a portion of the executable program 25. As shown by FIG. 2, the executable program 25 may include a set or block of code 61 followed by an unconditional branch instruction, referred to hereafter as "unconditional branch A." The block of code 61 includes one or more instructions that are to be executed by the processing circuitry 32.

Although not necessary in implementing the present invention, the block of code 61 and the unconditional branch A instruction may be instructions translated from instructions in the source program 23 by the compiler 27. As an example, the block of code 61 may be a set of instructions and/or statements (e.g., a subroutine) that performs a particular function when called by a function call and, therefore, executed by the processing circuitry 32, and the unconditional branch A instruction may be a return instruction that, when executed, causes the execution of the program 25 to branch to the next instruction after the aforementioned function call. However, it should be noted that the unconditional branch A instruction may be any other type of unconditional branch instruction in other embodiments.

Further shown by FIG. 2, the executable program 25 may include another set or block of code 65, referred to hereafter as "testing code 65," after the unconditional branch A instruction. In memory, the testing code 65 may be contiguous to the unconditional branch A instruction to enable the testing code 65 to immediately execute when execution of the unconditional branch A instruction is prevented, as will be described in further detail hereinafter. The testing code 65 preferably includes an instruction or a set of instructions that test for errors. As an example, the testing code 65 may include one or more assertions, which are well known statements for testing computer programs. In this regard, assertions are inserted by a compiler into a program being compiled, and when executed, an assertion tests for a certain condition. When the tested condition is true, the foregoing program is usually terminated, and an error message is displayed.

It should be noted that code 65 may include non-testing instructions in lieu of or in addition to the testing instructions described herein, and it is not necessary for the code 65 to perform any testing functionality when executed. In particular, the code 65 may perform any desired functionality without departing from the principles of the present invention, and utilizing the code 65 to test the execution of program 25 is described herein for illustrative purposes only.

In the preferred embodiment, the testing code 65 is followed by an unconditional branch instruction, which will be referred to hereafter as "unconditional branch B." The unconditional branch B instruction, when executed, preferably performs the same functionality as the unconditional branch A instruction, when the unconditional branch A instruction is executed. In this regard, both the unconditional branch A instruction and the unconditional branch B instruction, when executed, cause the execution of the program 25 to branch to the same location. However, the encoding defining the unconditional branch B instruction is preferably different and distinguishable from the encoding defining the unconditional branch A instruction. As used herein, the "encoding" of an instruction is the set of characters (e g., alphabetical, numerical, etc.) or, in other words, the expression used to represent the instruction in the program 25.

Figure 3:
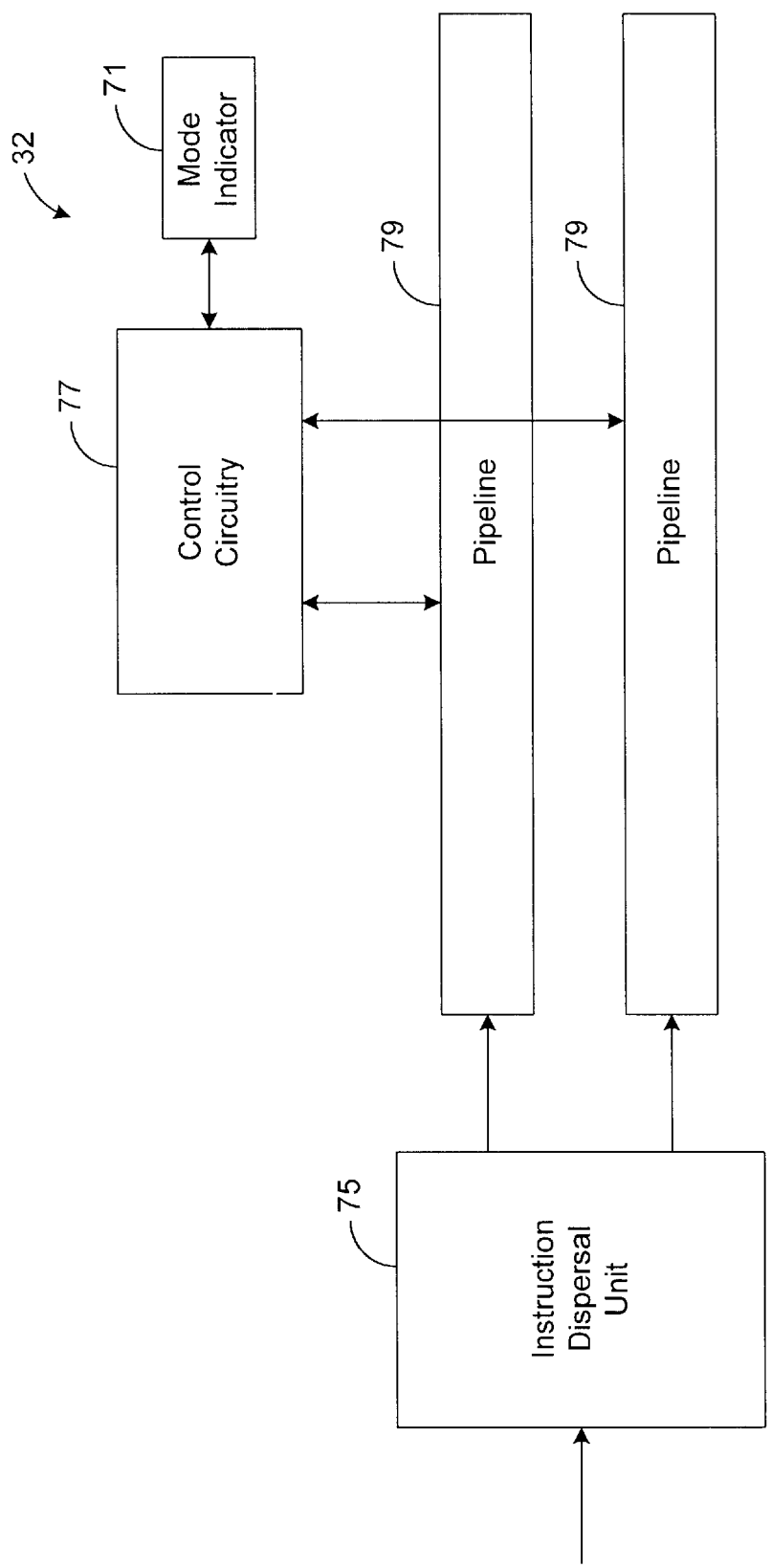
FIG. 3 is a block diagram illustrating a more detailed view of processing circuitry depicted in FIG. 1.

As shown by FIG. 3, the processing circuitry 32 preferably includes a mode indicator 71, such as a flag in a control register, for example, that indicates whether the testing code 65 is enabled or disabled. This indicator is preferably asserted or deasserted based on run time data, such as an input from input device 38 or other source. The run time data is indicative of whether or not the testing code 65 is to be enabled or disabled. In response to the run time data, the processing circuitry 32 updates the mode indicator 71. In this regard, if the run time data indicates that the testing code 65 is to be enabled, then the processing circuitry 32 preferably asserts the mode indicator 71. However, if the run time data indicates that the testing code 65 is to be disabled, then the processing circuitry 32 preferably deasserts the mode indicator 71. Once the mode indicator 71 has been set, the value of the mode indicator 71 is preferably maintained (e.g., unaltered) through the execution of the program 25. It should be noted that "setting" the mode indicator 71 in its general sense means modifying, if necessary, the value of the mode indicator 71 such that the mode indicator 71 properly indicates whether or not the testing code 65 is enabled. Therefore, "setting" the mode indicator 71 could include asserting and/or deasserting one or more bits of the mode indicator 71, when the mode indicator 71 is represented as a bit value.

Although the status of the mode indicator 71 may be based on an input from the input device 38, the status of the mode indicator 71 can be controlled from an input or another type of data from another source in another embodiment. For example, the run time data may be interfaced with the system 20 via network interface 52. Alternatively, the run time data may be produced via the execution of an instruction in the executable program 25 or in another program (not shown) that is executed by the processing circuitry 32. In particular, the run time data may be passed to the executable program 25 from another program (not shown) that calls the executable program 25. The techniques used to control the status of the mode indicator 71 are not important in implementing the present invention, and various methodologies may be used to set the mode indicator 71 without departing from the principles of the present invention.

When the mode indicator 71 is asserted and the testing code 65 is, therefore, enabled, the processing circuitry 32 is configured to ignore or, in other words, to refrain from executing each unconditional branch A instruction received by the processing circuitry. When the mode indicator 71 is deasserted and the testing code 65 is, therefore, disabled, the processing circuitry 32 is configured to execute each unconditional branch A instruction within the program flow of the executing program 25. Furthermore, the processing circuitry 32 is configured to execute each unconditional branch B instruction within the program flow of the executing program 25, regardless of the status of the mode indicator 71.

FIG. 3 depicts an exemplary embodiment of the processing circuitry 32. The processing circuitry 32 of FIG. 3 includes an instruction dispersal unit 75, control circuitry 77, and one or more pipelines 79. The instruction dispersal unit 75 receives instructions that are to be processed and, if appropriate, executed by one of the pipelines 79. The instruction dispersal unit 75 is an interface to the processing 32 and passes each of the received instructions to the appropriate pipeline 79 for processing.

The control circuitry 77 controls the operation of the pipelines 79. For example, through conventional techniques, the control circuitry 77 may control when instructions are stepped through different stages of the pipelines 79 and whether or not each of the instructions is fully executed by its respective pipeline. When the control circuitry 77 determines that an instruction being processed by the pipelines 79 should not be executed, the control circuitry 77 controls the operation of the pipelines 79 such that the instruction passes through the pipelines 79 without executing. The general functionality of controlling the operation of the pipelines 79, once a determination has been made that an instruction should not execute, such that the instruction passes through the pipelines without executing should be well known in the art. Note that processing circuitry 32 may be implemented by configurations different than the one shown by FIG. 3, and the configuration of FIG. 3 is shown for illustrative purposes only.

The control circuitry 77 of the present invention is configured to maintain the mode indicator 71 and prevent or allow execution of each unconditional branch A instruction within the program flow of the executing program 25 based on the status of the mode indicator 71. Therefore, the control circuitry 77 is configured to control the operation of the pipelines 79 such that each unconditional branch A instruction processed by any of the pipelines 79 passes through the processing pipelines 79 without execution when the mode indicator 71 is asserted. If the mode indicator 71 is deasserted, then the control circuitry 77 enables execution of each unconditional branch A instruction that passes through the pipeline 79, unless execution of the instruction should be prevented for some reason other than the status of the mode indicator 71.

Therefore, when the mode indicator 71 is asserted and the testing code 65 is enabled, the unconditional branch A instruction should not be executed. Consequently, when the block of code 61 is executed, the execution of the program 25 should flow from the block of code 61 to the testing code 65, thereby resulting in the execution of testing code 65. Once execution of the testing code 65 is complete, the unconditional branch B instruction is executed, thereby causing the execution of the program 25 to branch to an address identified in the unconditional branch B instruction. However, when the mode indicator 71 is deasserted and the testing code 65 is disabled, the execution of the program 25 should flow from the block of code 61 to the unconditional branch A instruction, which causes the execution of the program 25 to branch to an address identified in the unconditional branch A instruction. As a result, execution of the testing code 65 is prevented.

As previously set forth, in the preferred embodiment, the address branched to by the unconditional branch A instruction and the address branched to by the unconditional branch B instruction are the same. By identifying the same address in the unconditional branch A and unconditional branch B instructions, the execution of the program 25 should continue from the same point or address (i.e., from the address identified by the unconditional branch A and unconditional branch B instructions) regardless of whether or not testing code 65 is executed (i.e., regardless of the status of the mode indicator 71). However, it should be noted that it is not necessary for the execution of the program 25 to continue from the same point, as described in the preferred embodiment. Therefore, it is not necessary in every embodiment for the address branched to by the unconditional branch A instruction to be the same as the address branched to by the unconditional branch B instruction.

As a result of the foregoing, the system 20 of the present invention enables the testing code 65 to be selectively executed based on run time data without affecting the execution performance of the executable program 25. In this regard, the mode indicator 71 can be asserted at run time to enable the testing code 65 to be executed and, therefore, to enable the execution of the program 25 to be tested by the testing code 65. This helps to ensure that the execution of the program 25 is progressing correctly and helps to prevent errors. However, when performance is important, the mode indicator 71 can be deasserted so that the program 25 optimally executes without executing the testing code 65.

Furthermore, the presence of the testing code 65 in the program 25 should not affect the execution performance of the program 25 when executing in the optimal mode. As can be seen by referring to FIG. 2, when the mode indicator 71 is deasserted and the testing code 65 is disabled, only the instructions in the block of code 61 and the unconditional branch A instruction are executed in the portion of the program 25 shown by FIG. 2. These are the exact same instructions that would be executed if the testing code 65 and the unconditional branch B instruction were completely removed from the program 25. Therefore, including the testing code 65 in the program 25 should not cause any needless delays or the execution of any additional instructions, when the program 25 is executed in the optimal mode (i.e., when the testing code 65 is disabled).

It should be noted that various modifications may be made to the aforementioned embodiments to enable selective execution of the testing code 65. For example, copending U.S. Patent Application entitled, "System and Method for Enabling Selective Execution of Computer Code," filed on even date herewith, assigned Ser. No. 09/191,960, now U.S. Pat. No. 6,289,442, which is incorporated herein by reference, describes various embodiments that may be used to enable selective execution of computer code.

OPERATION

The preferred use and operation of the system 20 and associated methodology are described hereafter.

Figure 4:
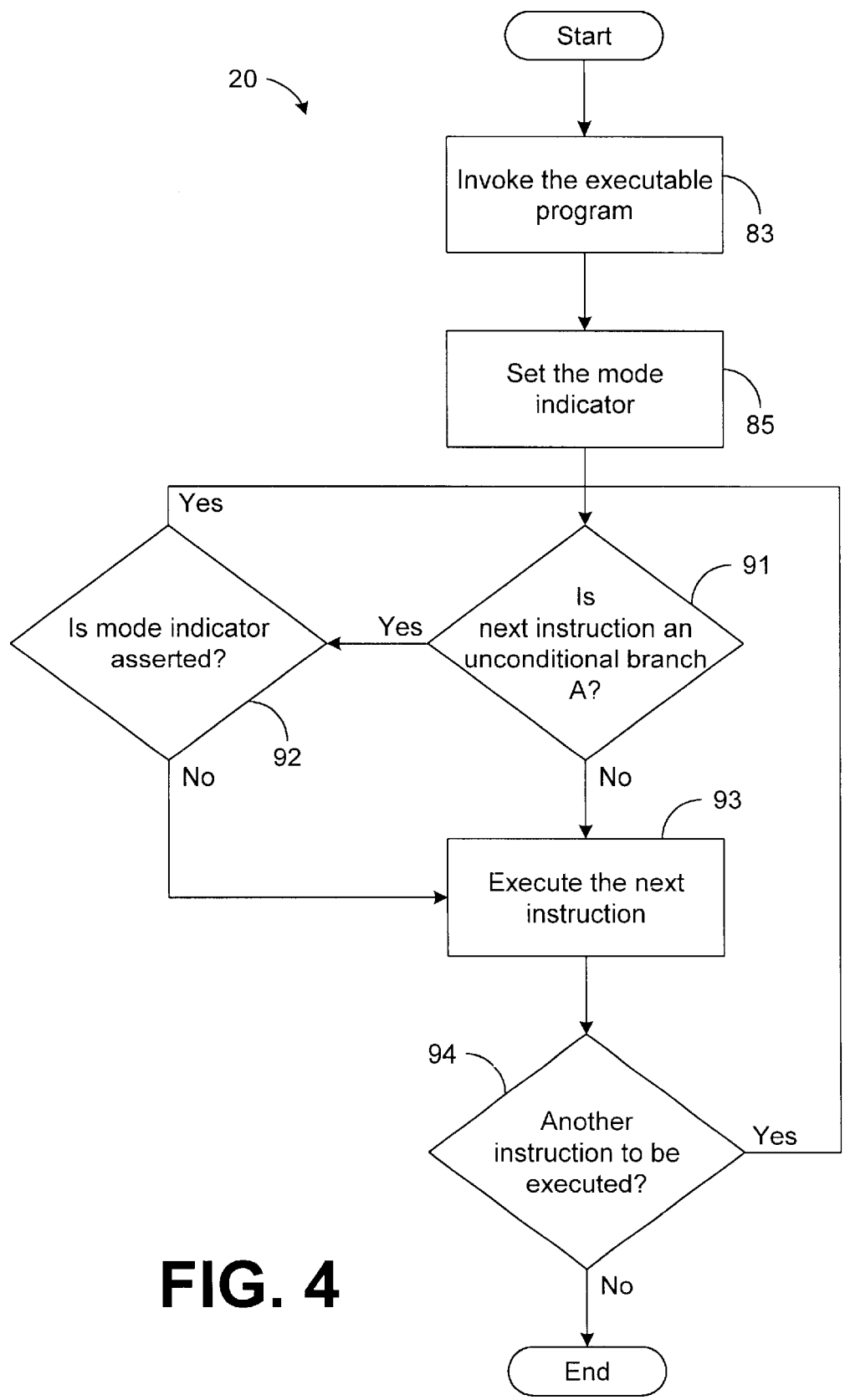
FIG. 4 is a flow chart illustrating the architecture and functionality of the computer system of FIG. 1 in executing the executable program depicted in FIG. 2.

A user via input device 38 enters an input that invokes the executable program 25, as shown by block 83 of FIG. 4. In response, instructions from executable program 25 are transmitted to processing circuitry 32 for execution. Assume that the program flow includes at least the block of code 61 shown by FIG. 2.

To select the mode of operation, the user may enter another input via input device 38 indicating whether or not the user wishes to enable the testing code 65. In a first mode of operation, assume that the user enters an input indicating that the testing code 65 is to be enabled. In response, the processing circuitry 32 asserts the mode indicator 71 in block 85 of FIG. 4. Therefore, when the program counter reaches the unconditional branch A instruction (i.e., when the execution of the program 25 reaches the unconditional branch A instruction), control circuitry 77 prevents the unconditional branch A instruction from being executed, as shown by blocks 91–94 of FIG. 4. As a result, the program counter moves to an instruction in the testing code 65. In other words, the execution of the program 25 falls through the unconditional branch A instruction of FIG. 2 and executes an instruction in the testing code 65 rather than branching to the address identified by the unconditional branch A instruction.

Then, the instructions in the testing code 65 are executed. Once the testing code 65 is executed, the unconditional branch B instruction should be the next instruction to be executed. Thus, the execution of the program 25 branches to the address identified by the unconditional branch B instruction. In the preferred embodiment, this address is the same address that would have been branched to had the unconditional branch A instruction been fully executed. The execution of the program 25 then continues from the branched address.

In a second mode of operation, assume that the user enters an input indicating that the testing code 65 is to be disabled instead of enabled. In response to such an input, the processing circuitry 32 deasserts the mode indicator 71 in block 85 of FIG. 4. Therefore, when the program counter reaches the unconditional branch A instruction (i.e., when the execution of the program 25 reaches the unconditional branch A instruction), control circuitry 77 enables execution of the unconditional branch A instruction, as indicated by blocks 91–94 of FIG. 4. As a result, execution of the program 25 branches to the address identified by the unconditional branch A instruction without executing the testing code 65. The execution of the program 25 then continues from the branched address. Thus, the system 20 operates in an optimal mode just as if the testing code 65 was not even included in the program 25.

It should be noted that, for simplicity, FIG. 2 shows only one set of testing code 65. However, in other embodiments, the program 25 may include other sets of testing code 65 at various locations in the program 25 in which each set of testing code 65 is preceded by an unconditional branch A instruction and is succeeded by an unconditional branch B instruction, as described above. Therefore, when the mode indicator 71 in the processing circuitry 32 is asserted, each of the sets of testing code 65 is enabled and may be executed, and when the mode indicator 71 in the processing circuitry 32 is deasserted, each of the sets of testing code 65 is disabled.

It should be further emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer system for selectively executing sets of code in computer programs, comprising:

memory for storing a computer program, said computer program having a set of code and a first unconditional branch instruction, said first unconditional branch instruction encoded with a first expression; and processing circuitry configured to receive run time data indicating whether said set of code is enabled and to set a value of a mode indicator based on said run time data, said processing circuitry configured to receive and process said first unconditional branch instruction during a run of said computer program, said processing circuitry further configured to execute said first unconditional branch instruction, based on said mode indicator, when said set of code is disabled and to refrain from executing said first unconditional branch instruction, based on said mode indicator, when said set of code is enabled, said processing circuitry further configured to refrain from executing, based on said mode indicator, each unconditional branch instruction that is encoded with said first expression and that is received by said processing circuitry during said run of said computer program, wherein said set of code includes a second unconditional branch instruction encoded with a second expression, said processing circuitry further configured to process, independent of said mode indicator, each unconditional branch instruction that is received by said processing circuitry and that is encoded with said second expression.

2. The system of claim 1, wherein said processing circuitry is further configured to maintain said value of said mode indicator during said run of said computer program and until termination of said run.

3. The system of claim 1, wherein said set of code, when executed by said processing circuitry, tests for errors that occur during said run of said program.

4. The system of claim 1, wherein said first unconditional branch instruction, in said memory, is contiguous to said set of code.

5. The system of claim 1, wherein said first unconditional branch instruction identifies a location in said memory, and wherein said second unconditional branch instruction identifies said location in said memory.

6. The system of claim 5, wherein said first and second unconditional branch instructions, in said memory, are each contiguous to said set of code.

7. A method for selectively executing sets of code in computer programs, comprising the steps of:

storing a computer program, said computer program having a set of code and a first unconditional branch instruction:

receiving run time data, during a run of said program, indicating whether said set of code is enabled;

setting a value of a mode indicator based on said run time data;

determining whether to execute said first unconditional branch instruction based on said value of said mode indicator;

processing said first unconditional branch instruction base on said determining step;

executing said set of code if a determination is made in said determining step to refrain from executing said first unconditional branch instruction;

identifying a location in memory via said first unconditional branch instruction; and executing a second unconditional branch instruction in response to said executing said set of code step, said executing a second unconditional branch step including the step of branching to said location in memory.

8. The method of claim 7, further comprising the step of:

maintaining said value of said mode indicator during said run of said computer program and until a termination of said run.

9. The method of claim 7, wherein said first unconditional branch instruction is contiguous to said set of code in memory.

* * * * *

UNITED STATES PATENT AND TRADEMARK OFFICE
CERTIFICATE OF CORRECTION

PATENT NO.    : 6,654,877 B1
DATED         : November 25, 2003
INVENTOR(S)   : Jerome C. Huck It is certified that error appears in the above-identified patent and that said Letters Patent is hereby corrected as shown below:

Column 10,
Line 10, delete "base" and insert therefor -- based --

Signed and Sealed this

Fifteenth Day of February, 2005

JON W. DUDAS
*Director of the United States Patent and Trademark Office*